United States Patent [19]

Rizzo

[11] 4,393,802
[45] Jul. 19, 1983

[54] BOAT HULL WITH UNDERSIDE CHANNEL

[76] Inventor: Salvatore A. Rizzo, P.O. Box 87, E. Setauket, N.Y. 11733

[21] Appl. No.: 150,338

[22] Filed: May 16, 1980

[51] Int. Cl.³ .................................................. B63B 1/38
[52] U.S. Cl. ................................... 114/67 A; 114/140
[58] Field of Search ................... 114/67 A, 289, 290, 114/140; 440/45, 44; 180/126

[56] References Cited
U.S. PATENT DOCUMENTS

| 928,579 | 7/1909 | Apel | 114/67 A |
| 3,518,956 | 7/1970 | Girodin | 114/67 A |
| 4,083,425 | 4/1978 | Rickards | 180/126 X |

FOREIGN PATENT DOCUMENTS

| 275333 | 4/1965 | Australia | 114/67 A |
| 1264064 | 12/1961 | France | 114/67 A |
| 162916 | 5/1921 | United Kingdom | 114/67 A |
| 1210973 | 11/1970 | United Kingdom | 114/67 A |

Primary Examiner—Sherman D. Basinger
Attorney, Agent, or Firm—Bernard Malina

[57] ABSTRACT

A motor boat hull is provided with a longitudinal channel formed in the central portion of the underside surface, starting at an intermediate location and terminating at the stern. Exhaust gases from the propulsion engine are introduced into the forward portion of the channel and the gases flow toward the stern thereby reducing the contact of the hull with the water and reducing the hull-to-water friction levels and reducing the power required to propel the hull at a given speed.

12 Claims, 14 Drawing Figures

BOAT HULL WITH UNDERSIDE CHANNEL

BACKGROUND OF THE INVENTION

It has long been recognized that one of the principle factors which determines the amount of power which is required to propel a hull at a given speed is the effect of skin resistance or skin friction. This effect results from adhesive forces between the hull surface and the water which causes a belt of eddying water to be maintained close to the surface of the hull. The energy required to overcome the skin friction of the hull increases the fuel consumption and decreases the overall efficiency of the vessel. With the advent of ever rising fuel costs and in view of the desire for increased travel speeds, the effects of skin friction assume important proportions.

In the past various expedients have been resorted to in an attempt to reduce the effects of skin friction. Included among these are attempts to reduce skin friction by making the surface of the hull extremely smooth in an effort to reduce the adhesive forces between the water and the hull. This technique has several practical disadvantages among which are increased initial manufacturing costs and increased operating costs resulting from a need to periodically clean the hull to remove fouling matter. In addition, there are inherent limitations on the degree of smoothness which can be achieved on a hull of relatively large size before the associated manufacturing costs become prohibitive.

OBJECTS OF THE INVENTION

It is a principle object of the present invention to overcome the limitations of the prior art by providing a hull which utilizes the engine exhaust gases to decrease the skin resistance.

Another object of the present invention is to provided a hull having a longitudinal channel into which exhaust gases are introduced.

Another object of the present invention is to provided a hull having a port and a starboard keel each having a longitudinal groove into which exhaust gases are introduced.

Another object of the present invention is to provide a hull having minimum skin resistance, manufactured of foamed plastic materials of different densities to provide great stability and self-righting characteristics.

Another object of the present invention is to provide a hull in which engine exhaust gases are directed under the hull and channeled to provide laminar flow.

Still another object of the present invention is to provide a hull having greatly decreased skin resistance which can be readily manufactured at a relatively low unit cost.

SUMMARY OF THE INVENTION

In accordance with the present invention, there is provided a boat hull having a longitudinal channel formed in the central portion of the underside of the hull. The longitudinal channel starts at an intermediate portion of the hull aft of the bow and terminates at the stern. Exhaust gases from the engine are introduced into the forward portion of the channel and the gases flow toward the stern thereby reducing the contact of the hull with the water and reducing the hull-to-water friction and skin resistance.

The hull also has a port and a starboard keel located, one each, on either side of the longitudinal channel. The underside of each of the keels has a longitudinal channel into which exhaust gases are introduced. The introduction of the exhaust gases into the longitudinal channel and into the grooves in the keels reduces the power required to propel the hull at a given speed and thereby increases the overall efficiency of a vessel incorporating the invention.

In an alternative construction of the invention, longitudinal strakes or ribs are provided within the longitudinal channel to maintain the linear flow of the gases and to reduce turbulence.

In another alternative construction of the invention, a flexible seal is provided at the aft end of the longitudinal channel. The flexible seal comprises a flexible envelope, or bag, having an inlet into which a small portion of the exhaust gases from the engine is introduced, thereby inflating the bag. Bleed holes are provided in the aft portion of the bag to permit the exhaust gases to escape. Cable stays are provided which maintain the bag in a nearly vertical configuration when it is inflated.

Additional objects and advantages of the invention will become apparent during the course of the following specification when taken in connection with the accompanying drawings in which:

DETAILED DESCRIPTION OF THE INVENTION

Figures 1, 2, 3A:
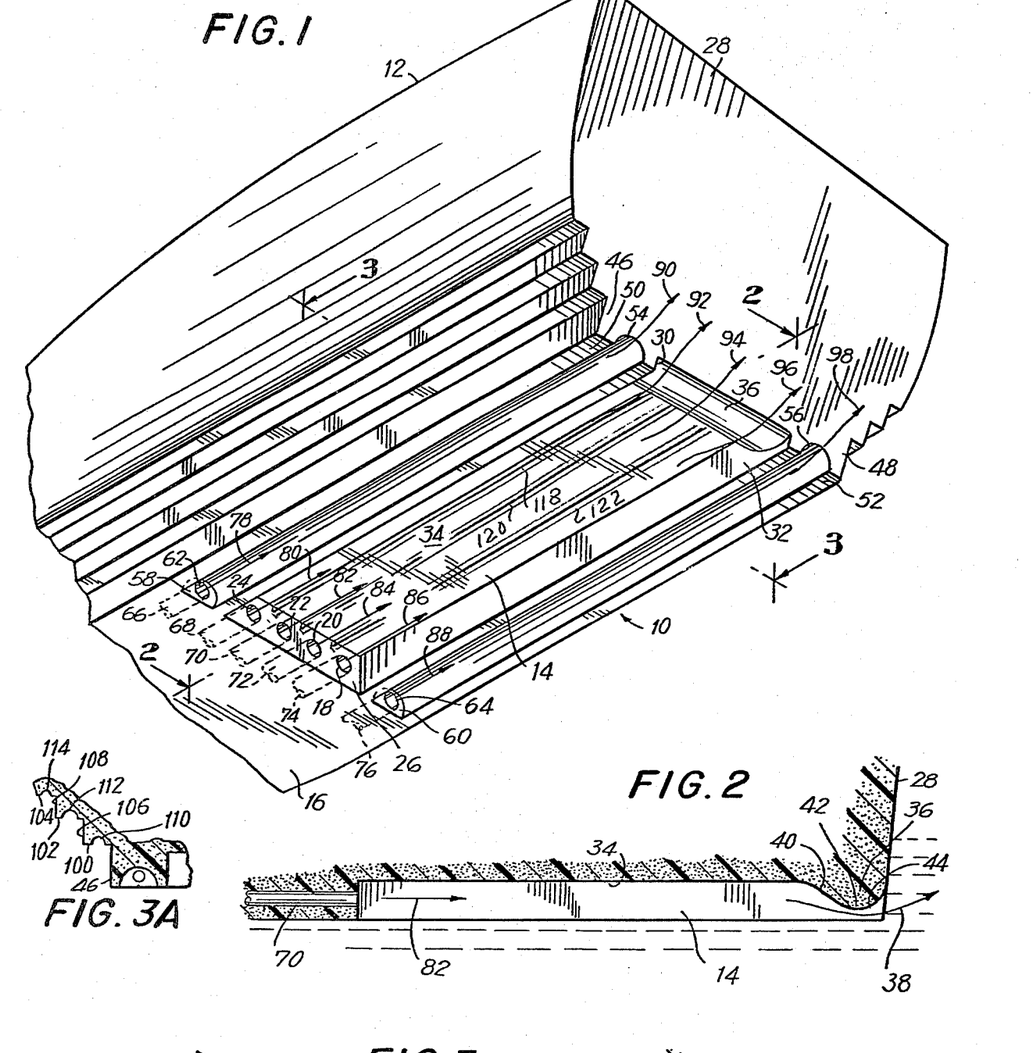
FIG. 1 is a fragmentary perspective view of a boat hull, made in accordance with the present invention, with the direction of flow of the exhaust gases shown by means of arrows.
FIG. 2 is a fragmentary longitudinal sectional view taken along the line 2—2 of FIG. 1.
FIG. 3A is a fragmentary cross-sectional view, similar to FIG. 3, showing a modified construction of the side of the hull.
Figure 3:
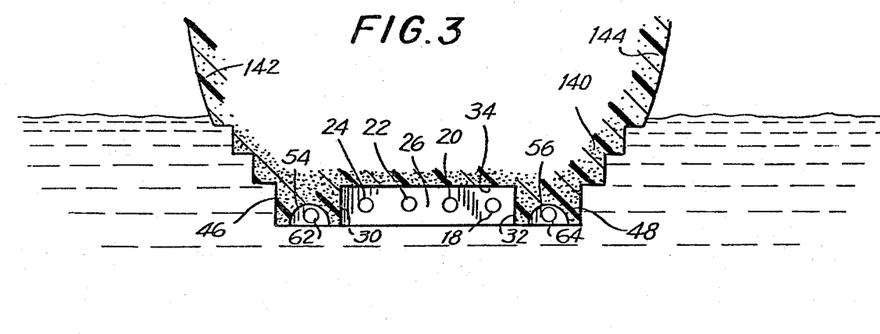
FIGS. 3 and 3B are fragmentary cross-sectional views taken along the line 3—3 of FIG. 1 showing the hull in water.
Figure 3B:
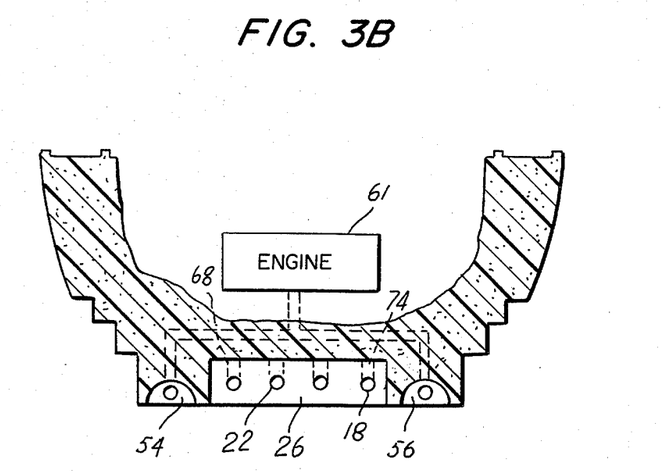

With reference to the drawings, there is shown in FIGS. 1–3, by way of example, a boat hull with a longitudinal channel 10, made in accordance with the present invention comprising a hull 12 with a longitudinal channel 14 formed on its underside 16 and with a plurality of exhaust ports 18, 20, 22, 24 directing engine exhaust gases into the channel.

The forward end of the channel 14 is defined by a transverse wall 26 in which the exhaust ports 18, 20, 22, 24 are mounted. The transverse wall 26 is located at an intermediate location on the hull 12, between the bow and the stern 28 such that the transverse wall 26 will always be underwater even when the bow leaves the water at high speeds. The channel 14 is further defined by a pair of spaced, parallel side walls 30, 32 an upper wall 34 and a second transverse wall 36. The second transverse wall 36 is formed as a downwardly directed extension of the stern 28 of hull 12 and is slightly shorter in height than the transverse wall 26 and the side walls 30, 32. This allows the exhaust gases to flow out past the stern 28 even when the boat is at rest thereby minimizing odors and discomfort to the passengers. The direction of the flow of the gas past the second transverse wall 36 is indicated by the arrow 38 in FIG. 2.

The second transverse wall 36 has a streamlined fairing portion 40 which makes a smooth transition between the forward portion of the second transverse wall 36 and the horizontal upper wall 34. The lower portion 42 and the rear portion 44 of the second transverse wall 36 are convexly rounded. The overall shape of the second transverse wall 36 thus minimizes the resistance to the flow of the exhaust gas as well as minimizes the resistance encountered by the hull 12 as it moves forward through the water.

A port 46 and a starboard 48 keel are formed, one each, outwardly of the walls 30, 32. The lower surfaces 50, 52 of the keels 46, 48 each have a concave longitudinal groove 54, 56 formed therein which starts at a forward wall 58, 60, which is disposed generally in line with the transverse wall 26, and terminates at the stern 28.

The forward walls 58, 60 each have an exhaust port 62, 64 through which exhaust gases are fed into the grooves 54, 56.

The exhaust ports 18, 20, 22, 24, 62, 64 each include pipe connection means 66, 68, 70, 72, 74 and 76 which are shown in fragmentary form in broken lines in FIG. 1. A plurality of longitudinal ribs or strakes 118, 120, 122 are disposed on the upper wall 34 of channel 34 and are disposed, one each, between the exhaust ports 24, 22, 20 and 18 respectively and extend from the transverse wall 26 to the stem 28 of the hull. It is a feature of the invention that the exhaust ports 18, 20, 22, 24, 62 and 64 are individually connected, one each, to a cylinder of the propulsion engine 61 of the boat and that the exhaust gases are directed in an aft direction parallel to the channel 14 and parallel to the keels 46 and 48. The direction of flow of the exhaust gases entering the channel 14 and the grooves 54, 56 is indicated by the arrows 78, 80, 82, 84, 86 and 88 in FIG. 1. The direction of flow of the gases, leaving the stern of the hull is indicated by the arrows 90, 92, 94, 96 and 98. FIG. 2 indicates the orientation of the exhaust pipe 70 parallel to the channel 14 and the flow of gas is indicated by the arrows 82 and 38. The propulsion engine and the connections of the exhaust pipes 66, 68, 70, 72, 74 and 76 to the engine are of a conventional nature and are not shown.

It is understood that a total of six exhaust ports have been shown by way of example only, and that the number of exhaust ports in practice is varied to conform to the number of cylinders in the propulsion engine of the vessel.

FIG. 3A shows an alternative construction of the side wall of the hull adjacent to the keel 46. In this construction, the horizontal portions 100, 102, 104 of the step-like portions 106 and 108 of the hull have longitudinal grooves 110, 112 and 114 which serve to increase the lateral resistance of the hull.

Figures 4, 5:
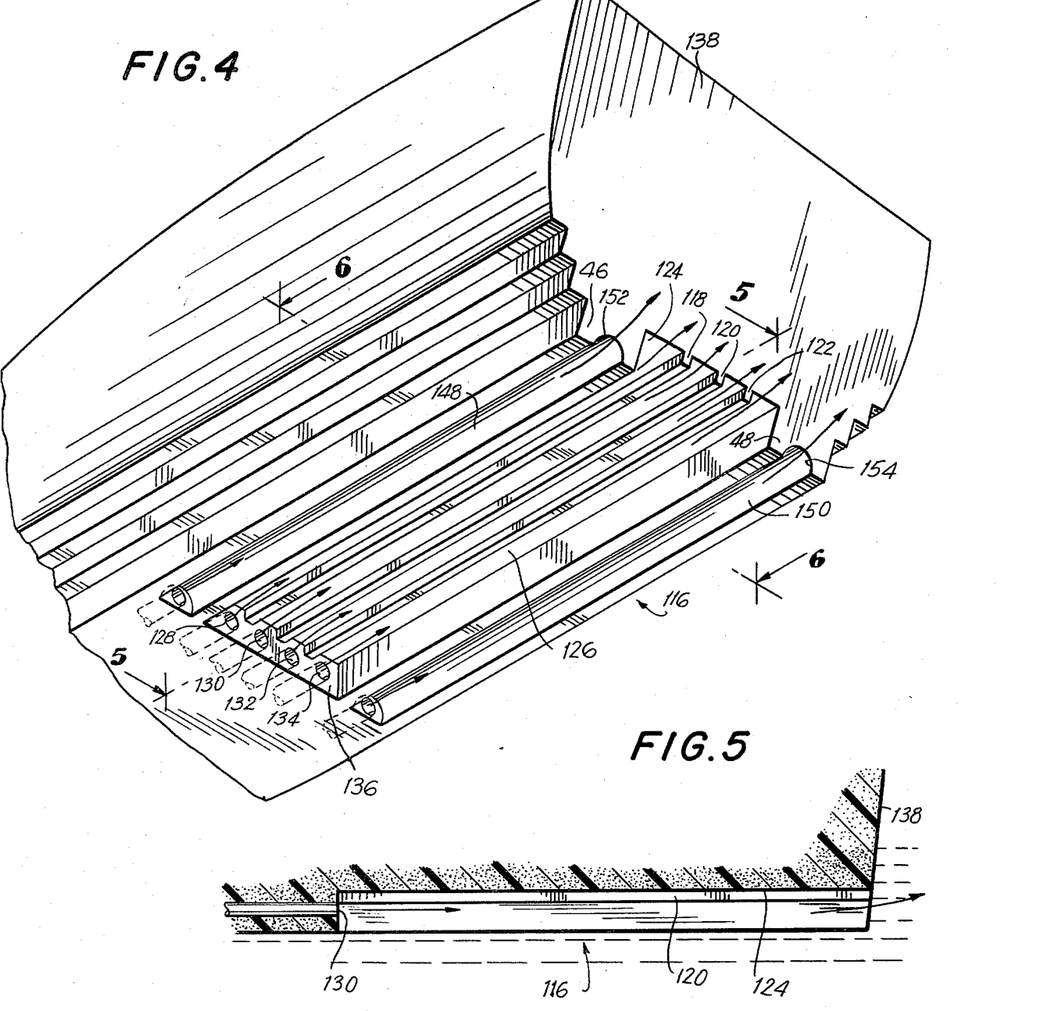
FIG. 4 is a fragmentary perspective view of a boat hull, similar to FIG. 1 showing an alternative construction of the invention in which longitudinal strakes are added to guide the flow of the exhaust gases.
FIG. 5 is a fragmentary longitudinal sectional view taken along the line 5—5 of FIG. 4.
Figure 6:
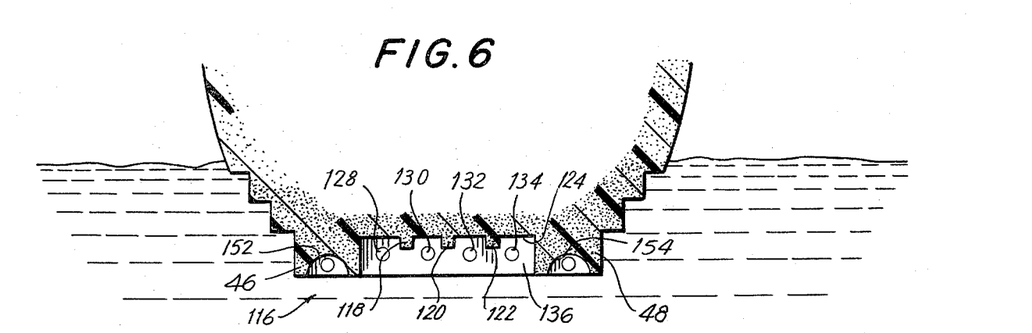
FIG. 6 is a fragmentary cross-sectional view taken along the line 6—6 of FIG. 4 showing the hull in water.
Figure 7:
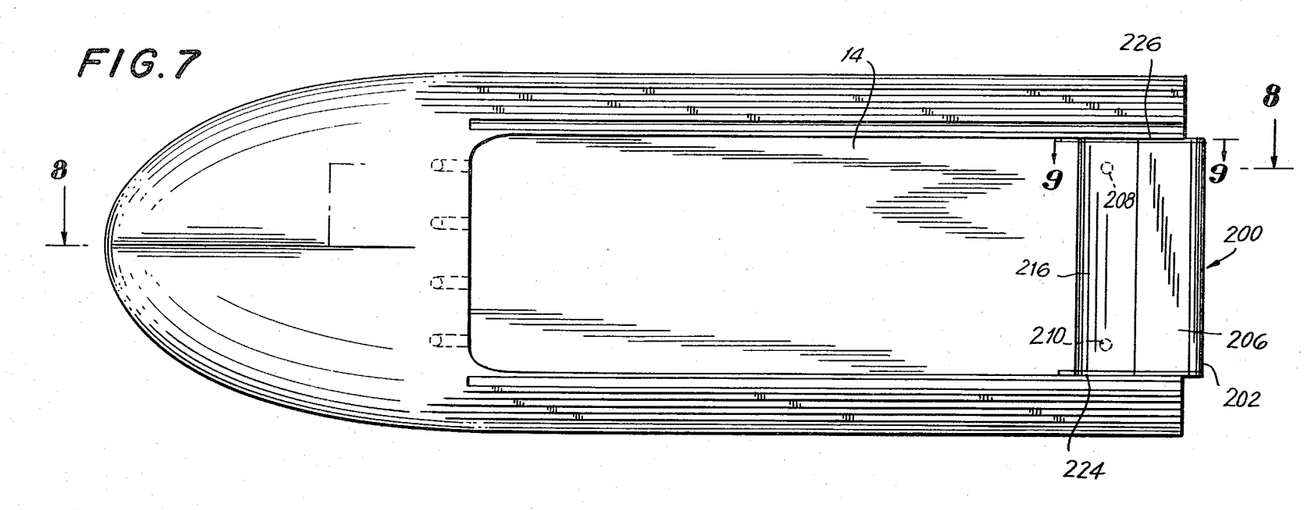
FIGS. 7 and 7A are respectively bottom and top views of an alternative construction of the invention showing the incorporation of flexible seal at the aft end of the hull.
Figure 7A:
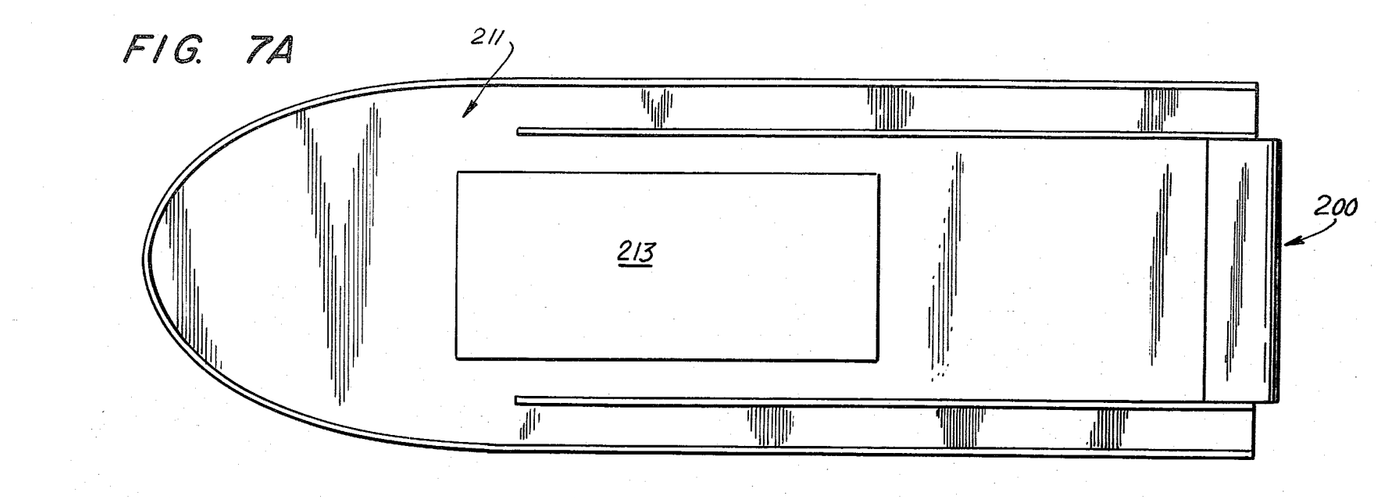

Another alternative construction of a boat hull 116 according to the present invention is shown in FIGS. 4–6 in which a plurality of longitudinal ribs or strakes 118, 120, 122 are disposed on the upper wall 124 of the channel 126 and projecting downwardly into the channel. The strakes 118, 120 and 122 are disposed, one each, between the exhaust ports 128, 130, 132 and 134 respectively, and they extend from the transverse wall 136 to the stern 138 of the hull. The strakes 118, 120 and 122 help to maintain the linear flow of the gases and to reduce turbulence. In the construction shown in FIG. 4, the flow of gases in the grooves 148, 150 flows out past the stern 138 via the openings 152 and 154.

During operation, the boat hulls 10, 116 according to the present invention, ride on a film of exhaust gas which reduces the hull-to-water friction drag and reduces the power required for a given hull speed. At high speeds, when only the twin keels 46 and 48 are in contact with the water, the grooves 54 and 56 and the bottoms of the keels continue to reduce the frictional drag.

Figure 8:
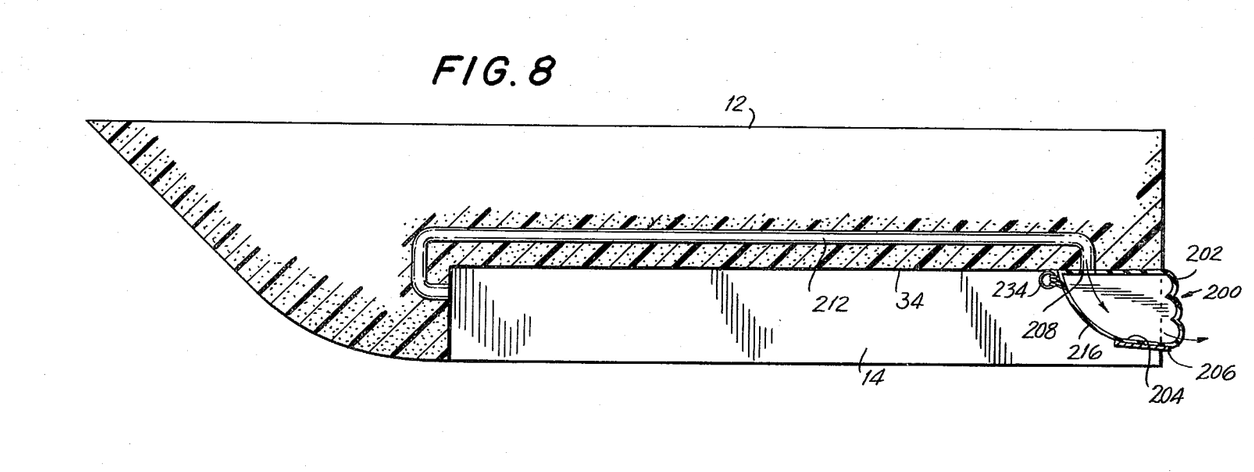
FIGS. 8 and 8A are cross-sectional views taken along the line 8—8 of FIG. 7 showing the inflatable seal.
Figure 8A:
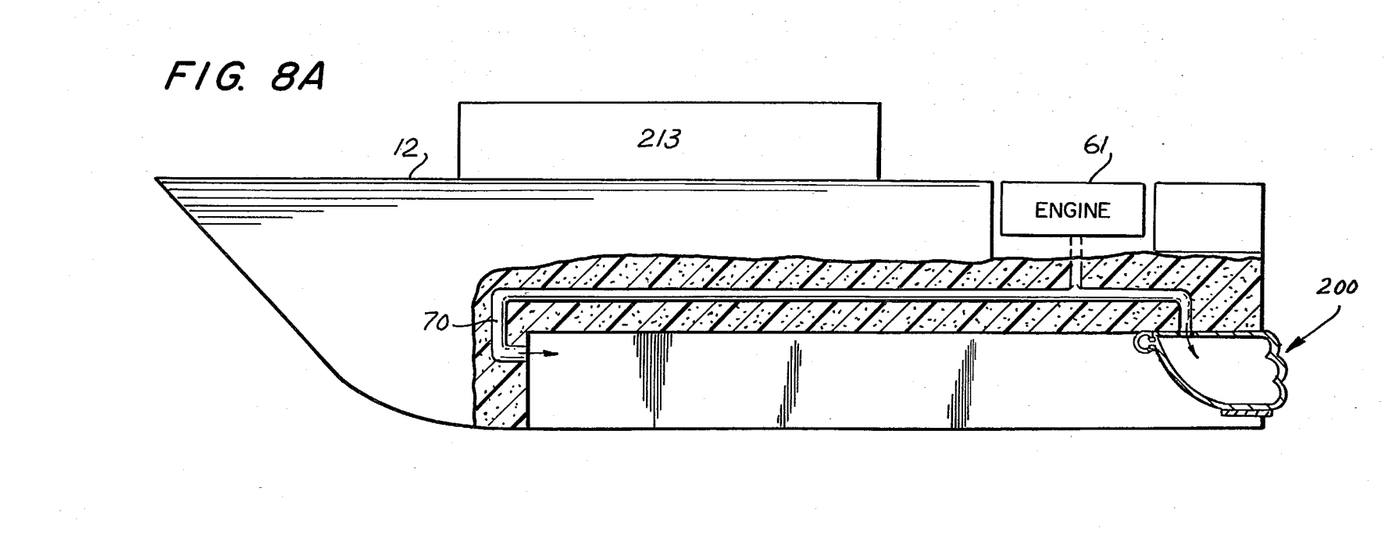
Figure 9:
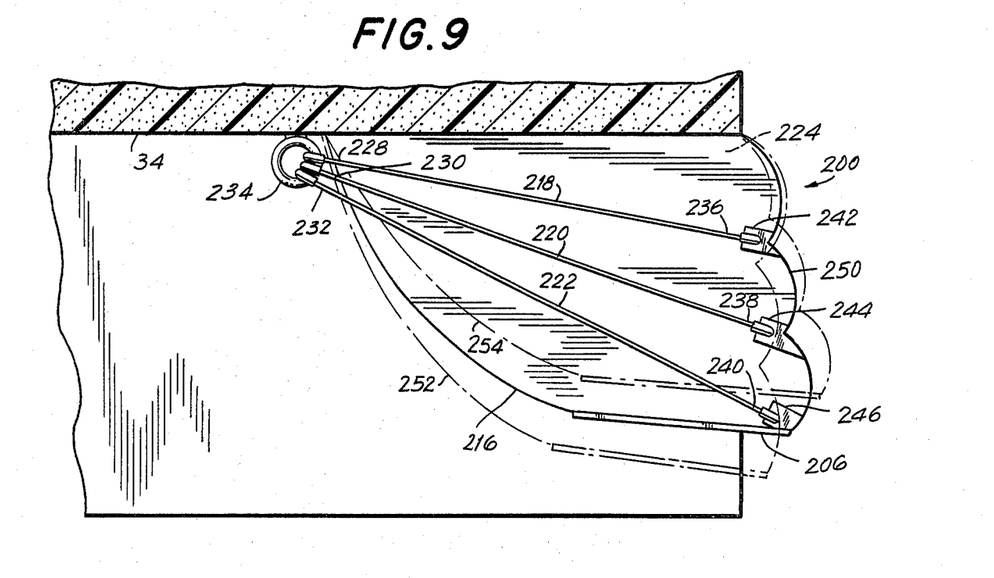
FIG. 9 is a fragmentary cross-sectional view taken along the line 9—9 of FIG. 7 showing the edge of the inflatable seal and the cable stays and with various positions of the inflatable seal assumed during operation shown in broken lines.
Figure 10:
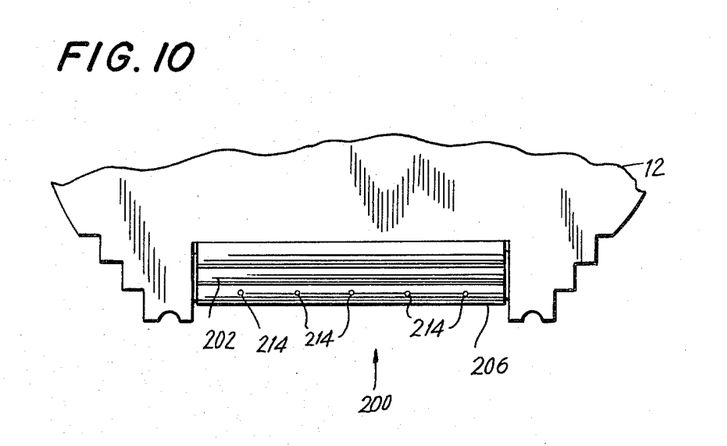
FIG. 10 is a fragmentary elevation view of the stern of the boat hull of FIG. 7 showing the aft portion of the inflatable seal.

In another alternative construction of the invention, shown in FIGS. 7–10, the second transverse wall 36 of FIG. 1 is replaced by a flexible seal 200 which is located at the aft end of the channel 14. The flexible seal 200 includes a flexible envelope 202, or bag, which extends across the width of the channel 14 and has on its lower surface 204 a solid plate 206. The flexible envelope 202 has a pair of inlet ports 208, 210 and pipe connection means 212 are provided to introduce a small part of the engine exhaust into the envelope. A plurality of bleed holes 214 are provided along the aft bottom portion of the envelope 202 to enable the exhaust gas to escape along with any water which may enter the envelope 202 while the hull is at rest or through leaks. The upper surface of the envelope 202 is secured to the surface 34 of the hull 12 using conventional attachment means. The forward surface 216 of the envelope 202 is convexly curved, as is best shown in FIGS. 8 and 9, thereby minimizing the resistance to the flow of exhaust gas from the longitudinal channel 14 as well as minimizing the resistance of the hull 12 as it moves forward through the water.

The flexible seal 200 features the use of a plurality of cable stays 218, 220, 222 disposed adjacent to the side walls 224, 226 of the envelope 202, which maintain the generally vertical configuration of the seal 200 while enabling the seal to flex, thereby reducing the impact loading on the hull 12 which would otherwise be encountered during operation in heavy seas. The cable stays 212, 220, 222 each have a first end 228, 230, 232 connected to an eye fitting 234 on the surface 34 of the hull 12 slightly forward of the forward surface 216 of the envelope 202. The second ends 236, 238, 240 of the cable stays are each connected to fittings 242, 244, 246 located on the aft edge 250 of the envelope 202. The fitting 242 is located on an upper portion of the edge 250, the fitting 244 is located on a generally central portion of the edge 250 and the fitting 246 is located on the lower portion of the edge 250, adjacent to the plate 206. A similar arrangement of cables and fittings, which is not shown, is disposed adjacent to the opposite sidewall 226 of the envelope 202.

The envelope 202 is fabricated of a waterproof flexible material such as rubber and the solid plate 206 may be fabricated of suitable metal such as aluminum. The fittings 242, 246, 248 are attached to the envelope 202 using conventional means such as integrally molded tabs or the like.

In use, when the hull 12 is at rest, the envelope 202 is unpressurized and is limp, water enters the envelope through the bleed holes 214. When underway, a portion of the exhaust gas from the engine enters the envelope 202 through the inlet port 208, the remaining exhaust gas is fed to the longitudinal channel 14 as previously described. The envelope becomes inflated and assumes the configuration shown by the broken lines 252 in FIG. 9. When heavy seas are encountered the envelope flexes to momentarily assume first the solid line configuration 216 and for extremely heavy seas, the broken line 254 configuration. The stays 218, 220, 222 serve to restrain the envelope 202 and to maintain the generally vertical configuration of the flexible seal 200. The exhaust gas flows out of the envelope 202 through the bleed holes 214 and expells any water which entered the envelope.

In still another alternative construction of the invention, which is not shown, portions of the keels 46 and 48 may be varied in overall width and in overall elevation. In addition, the longitudinal grooves 54 and 56 may also be varied in width. The channel 14 may be sectioned into two or more portions through the incorporation of additional transverse walls similar to the wall 36. The sectioned portions of the channel may have equal or varied depths. The sectioning of the channels enables the remaining portions of the channel to continue to reduce friction in the event that water contacts the upper surface of one of the channel portions.

The boat hull, according to the present invention may be fabricated using selective placement of various densities of polyurethane foam. The bow and underwater portions 140 of the hull 12 are made of high density foam in order to minimize impact damage from debris and to provide weight for stability. The sides 142, 144 of the hull 12 above the waterline are made of lower density foam which is more bouyant. This makes the hull 12 self-righting when broached or tipped. Upper portions of the hull such as the walls and ceiling of cabin 213 and deck 211 (FIG. 7A) are made of a still lower density foam which is extremely bouyant thereby making the hull automatically self-righting in the event of a roll over. It has been found that sufficient strength can be developed in each of the various polyurethane foam densities through the addition of glass fiber.

While preferred embodiments of the invention have been shown and described herein, it is obvious that numerous omissions, changes and additions may be made in such embodiments without departing from the spirit and scope of the invention.

What is claimed is:

1. A hull for a motor boat having an internal combustion propulsion engine comprising a first pair of spaced apart vertical wall portions disposed on the undersurface of said hull and extending longitudinally with respect to said hull, a second pair of spaced apart vertical wall portions extending transversely with respect to said hull, with a first of said second pair of wall portions disposed at an intermediate location between the bow and the stern of said hull and with a second of said second pair of wall portions disposed proximate to said stern of said hull, a horizontally disposed wall portion extending between said first and said second pair of wall portions and with said first pair of wall portions, said second pair of wall portions and said horizontal wall portion, in combination defining a longitudinal cavity which projects inwardly into said hull, a plurality of exhaust ports disposed on said first wall of said second pair of wall portions, with said exhaust ports directed longitudinally with respect to said hull and directed toward said stern and connection means connecting said exhaust ports with said propulsion engine for the purpose of introducing exhaust gases into said cavity in order to reduce hull-to-water friction, a pair of longitudinal keel members disposed, one each, on port and on starboard sides of said cavity, with lower surfaces of said keel members including a longitudinally grooved portion, and connection means disposed to introduce exhaust gases from said propulsion engine into forward portions of said keel members.

2. A hull according to claim 1 in which said second wall of said second pair of walls is shorter in height than said first pair of longitudinal walls and said first wall of said second pair of transverse walls.

3. A hull according to claim 1 in which said second wall of said second pair of walls includes a streamlined fairing portion blending said second wall with said horizontal wall.

4. A hull according to claim 1 further comprising a plurality of longitudinal ribs projecting downwardly from said horizontal wall and located, one each, between said exhaust ports.

5. A hull according to claim 1 in which said connection means connect said exhaust ports individually, one each, to a cylinder of said propulsion engine.

6. A hull according to claim 1 in which said keels and below water portions of said hull are manufactured of relatively dense polyurethane foam and sides of said hull are manufactured of relatively less dense polyurethane foam.

7. A hull according to claim 6 in which said hull further comprises a deck and cabin structure manufactured of a relatively low density polyurethane foam.

8. A hull for a motor boat having an internal combustion propulsion engine comprising a first pair of spaced apart vertical wall portions disposed on the undersurface of said hull and extending longitudinally with respect to said hull, a vertical wall portion extending transversely with respect to said hull, disposed at an intermediate location between the bow and the stern of said hull, and sealing means disposed proximate to said stern and with said sealing means comprising a flexible envelope, a source of pressurized gas, and inflation means connected to said source of gas for inflating said flexible envelope, when in use, a horizontally disposed wall portion extending between said first pair of wall portions and said vertical wall portion and said sealing means with said first pair of wall portions, said vertical wall portion, said sealing means, and said horizontal wall portion, in combination, defining a longitudinal cavity which projects inwardly into said hull, a plurality of exhaust ports disposed on said vertical wall portion, with said exhaust ports directed longitudinally with respect to said hull and directed toward said stern and connection means connecting said exhaust ports with said propulsion engine for the purpose of introducing exhaust gases into said cavity in order to reduce hull-to-water friction; and a pair of longitudinal keel members disposed, one each, on port and on starboard sides of said cavity, with lower surfaces of said keel members including a longitudinally grooved portion, and connection means disposed to introduce exhaust gases from said propulsion engine into forward portions of said keel members.

9. A hull according to claim 8 in which said inflation means comprises pipe connection means leading from said propulsion engine to said flexible envelope for inflation of said flexible envelope using a portion of said exhaust gas and in which said flexible envelope includes at least one bleed hole permitting the escape of said exhaust gas.

10. A hull according to claim 8 in which said flexible envelope further includes a solid bottom plate.

11. A hull according to claim 8 restraint means urging said flexible envelope to a generally vertical position.

12. A hull according to claim 11 in which said restraint means comprise a plurality of cables each having a first end and a second end with said first ends connected to said hull at a point forward of said flexible envelope and with said second ends connected to a generally aft portion of said flexible envelope.

* * * * *